W. F. HOBBS.
SELF FASTENING FERRULE FOR TOOL HANDLES.
APPLICATION FILED JAN. 28, 1918.
1,272,042.
Patented July 9, 1918.
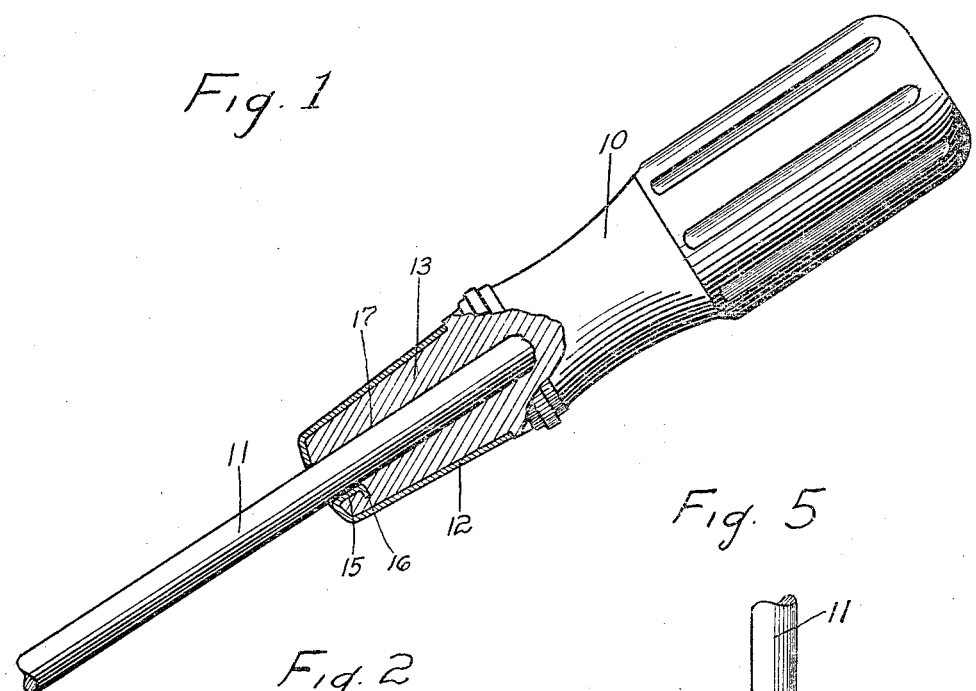
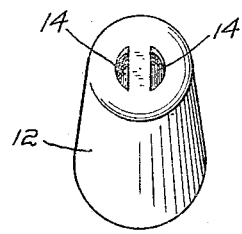
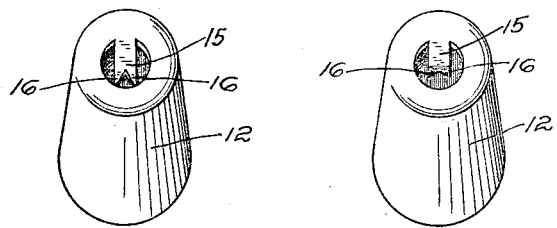
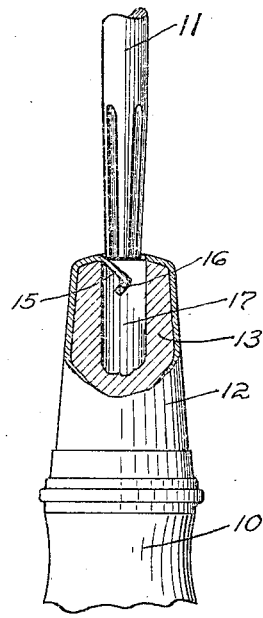
INVENTOR
Willis F. Hobbs
BY
A. M. Wooster
ATTORNEY

UNITED STATES PATENT OFFICE.

WILLIS F. HOBBS, OF BRIDGEPORT, CONNECTICUT.

SELF-FASTENING FERRULE FOR TOOL-HANDLES.

1,272,042.    Specification of Letters Patent.    Patented July 9, 1918.

Application filed January 28, 1918. Serial No. 214,089.

*To all whom it may concern:*

Be it known that I, WILLIS F. HOBBS, a citizen of the United States, residing at Bridgeport, county of Fairfield, State of Connecticut, have invented an Improvement in Self-Fastening Ferrules for Tool-Handles, of which the following is a specification:

This invention has for its object to provide a ferrule, adapted for use upon tool handles generally, which shall be inexpensive to produce, and which shall be made self fastening to the handle by the driving home of the shank of a tool.

It is of course well understood that the wooden handles of all kinds of tools are apt to shrink and leave the ferrule loose. This objection has been overcome in various ways, as by riveting, which appreciably increases the cost of production, and by indenting the ferrule into the wood from the outer side, which is not always effective and moreover impairs the appearance of the tool.

In order to overcome these objections, I have devised the novel self fastening ferrule which I will now describe referring to the accompanying drawing forming a part of this specification and using reference characters to indicate the several parts.

Figure 1 is an elevation partly broken away to show the way in which the ferrule is made self fastening.

Figs. 2, 3 and 4 are perspective views illustrating successive steps in the manufacture of the ferrule, and Fig. 5 is an elevation partly broken away showing the ferrule seated upon the handle and the tool shank ready to be driven home, as in Fig. 1.

10 denotes an ordinary wooden tool handle, 11 the shank of a tool and 12 the ferrule. The hub 13 at the inner end of the handle usually tapers more or less, as indicated in the drawing, and the ferrule is of course drawn to suitable shape to correspond with the hub. The head or shank receiving end of the ferrule, as ordinarily made, is provided with a hole round or angular as preferred, through which the shank is driven after the ferrule is seated on the hub of the handle.

In carrying out my present invention, instead of making the usual hole in the head of the ferrule, I make two segment shaped openings 14 therein, leaving a cross piece of the metal of the head between them, as clearly shown in Fig. 2. The next operation, the result of which is clearly shown in Fig. 3, detaches one end of the cross piece so that it becomes a tongue, indicated by 15, projecting from one side of the hole, and also removes metal from the free end of the tongue leaving it provided with one or more, preferably two, prongs 16 as shown in Fig. 3. The next operation, the result of which is shown in Figs. 4 and 5, bends the prongs inward at an angle to the tongue and also curves the tongue inward, more or less, as indicated. The end of the tool shank is usually tapered somewhat, as indicated, and may or may not be fluted as shown, the fluting being immaterial so far as the present invention is concerned. The effect of driving the tool shank home is to bend the tongue inward parallel with the wall of the hole in the handle, indicated by 17, and to drive the prong, or prongs, into the wood of the handle from the inner side as clearly shown in Fig. 1. This locks the ferrule to the handle so effectually that it can not become detached no matter how much the wood may shrink.

Having thus described my invetion I claim:

1. A self retaining ferrule for wooden tool handles, having a hole in its head and a pronged tongue adapted to be turned inward by the driving home of a tool shank, which also drives the prong from the inner side into the wood of the handle.

2. A self retaining ferrule for wooden tool handles, having a hole in its head and a tongue projecting from one side of the hole, and having a prong bent at an angle to the tongue, the tongue being adapted to be turned inward by the driving home of a tool shank, and the prong to be driven into the wood of the handle.

3. In combination, a wooden tool handle having a hole in one end, a ferrule having a hole in alinement with the hole in the handle, and a pronged tongue extending from one side of the hole in the ferrule, and a tool shank driven through the hole in the ferrule and into the hole in the handle, whereby the tongue is turned inward parallel with the wall of the hole in the handle and the prong is driven into the wood.

4. A ferrule of the character described, having a hole in its head, a tongue projecting from one side of the hole, and a prong at the end of the tongue bent at an angle thereto.

In testimony whereof I affix my signature.

WILLIS F. HOBBS.

Copies of this patent may be obtained for five cents each, by addressing the "Commissioner of Patents, Washington, D. C."